United States Patent [19]
Kinzer

[11] 4,238,338
[45] * Dec. 9, 1980

[54] APPARATUS FOR THE TREATMENT OF SEWAGE

[75] Inventor: Jay Kinzer, Denver, Colo.

[73] Assignee: Sanilogical Corporation, Denver, Colo.

[*] Notice: The portion of the term of this patent subsequent to Mar. 6, 1996, has been disclaimed.

[21] Appl. No.: 17,736

[22] Filed: Mar. 5, 1979

Related U.S. Application Data

[63] Continuation-in-part of Ser. No. 836,375, Sep. 26, 1977, Pat. No. 4,142,975, and Ser. No. 947,780, Oct. 2, 1978.

[51] Int. Cl.³ .............................................. C02F 3/20
[52] U.S. Cl. .................................. 210/195.4; 210/197; 210/201; 210/220
[58] Field of Search ....... 210/14, 15, 8, 3, 194–198 R, 210/220, 221 R, 221 P, 206, 252, 170, 199–202, 150

[56] References Cited

U.S. PATENT DOCUMENTS

| | | | |
|---|---|---|---|
| 3,563,888 | 2/1971 | Klock | 210/150 |
| 3,872,003 | 3/1975 | Walker | 210/14 |
| 3,883,424 | 5/1975 | Stamblesky et al. | 210/197 |
| 4,008,159 | 2/1977 | Besik | 210/14 |
| 4,021,347 | 5/1977 | Teller et al. | 210/195.1 |
| 4,142,975 | 3/1979 | Kinzer | 210/197 |

Primary Examiner—Benoit Castel
Attorney, Agent, or Firm—Dennis K. Shelton

[57] ABSTRACT

An apparatus for treating sewage to obtain substantially complete organic matter substrate and biological sludge oxidation prior to effluent discharge in a treatment system comprising a series of treatment chambers in a single unit; each treatment chamber having a generally circular peripheral crosssectional configuration, conduit means in each treatment chamber for directing the flow of mixed liquor in each chamber, gas supply means for supplying an oxygen containing gas to each treatment chamber so as to cause a continuous flow pattern of mixed liquor in the treatment chamber; inlet means for supplying raw sewage to the first treatment chamber of the series; outlet means for withdrawing clarified effluent from the last treatment chamber of the series; and fluid communication means for providing fluid communication between an intermediate top portion of each successive treatment chamber of the series. The system is preferably designed to provide environments suitable for microorganism growth and development through sewage organic matter consumption in the first treatment of the series, microorganism population maintenance in the next successive treatment chamber of the series and microorganism autodigestion in latter treatment chambers of the series, thereby providing an effluent substantially free of digestable organic matter and biological sludge.

5 Claims, 3 Drawing Figures

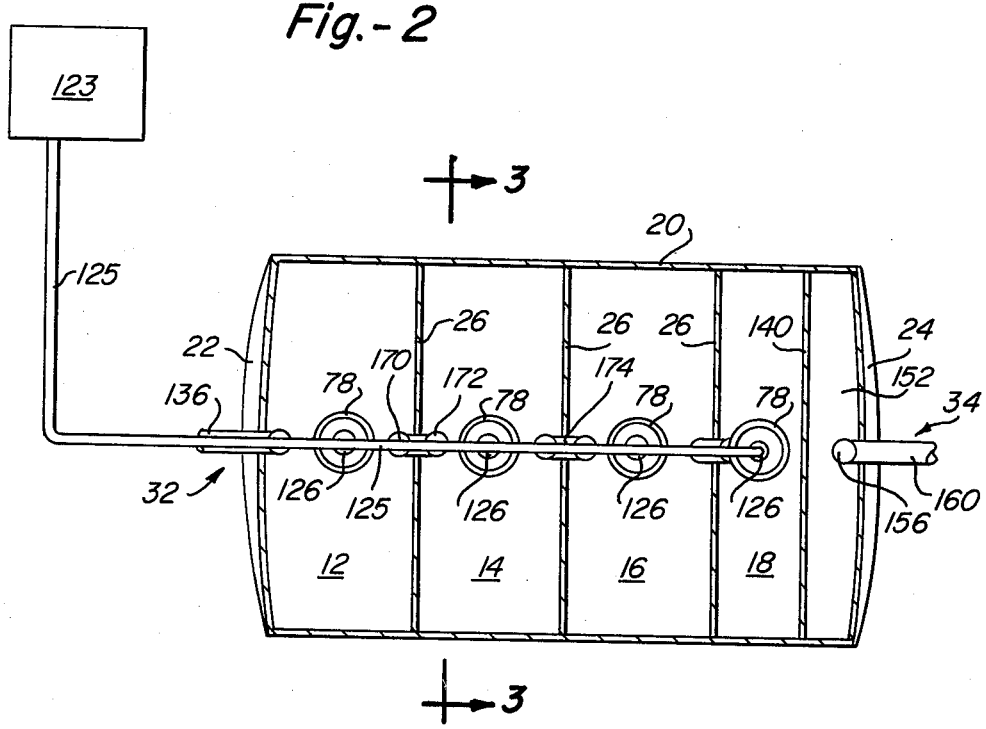
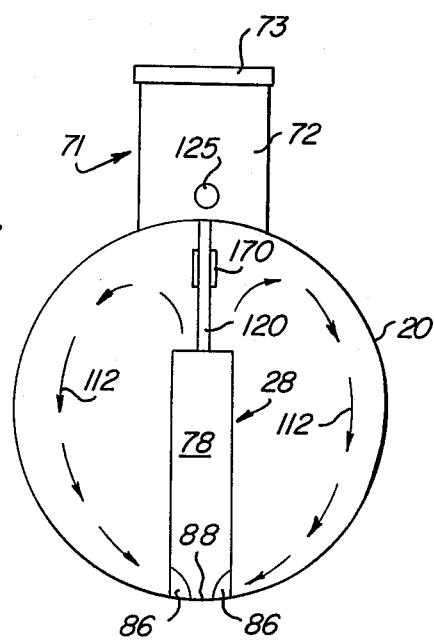

APPARATUS FOR THE TREATMENT OF SEWAGE

This application is a continuation-in-part of my copending U.S. Pat. applications Ser. No. 836,375 filed Sept. 26, 1977, now U.S. Pat. No. 4,142,975, and Ser. No. 947,780 filed Oct. 2, 1978.

BACKGROUND AND SUMMARY OF THE INVENTION

This invention relates to biological waste treatment systems and more particularly to methods and apparatus for treating sewage wastes through consumption of organic matter in the waste materials and reduction of microorganism content prior to effluent discharge.

Sewage wastes, particularly those of human origin, are conventionally treated with aerobic, organic matter consuming microorganisms to obtain a reduction in noxious substances in the sewage. For example, in the well known activated sludge process, raw sewage is commonly fed to one or more treatment chambers where it is agitated in the presence of oxygen and aerobic microorganisms (biological sludge). The microorganisms feed on the organic matter substrate in the sewage, and under a suitable balance of organic matter, oxygen and microorganisms, will substantially reduce the organic matter content of the sewage while growing and significantly increasing in population size. After an appropriate reaction period, the mixed liquor of treated sewage and microorganisms is typically transferred to a settling vessel where the microorganisms are allowed to settle from the mixed liquor to form a concentrated mass of the biological sludge. The supernatant from this settling process is discharged from the system as a "clarified effluent". A first portion of the settled biological sludge is then typically recycled to the treatment chamber to act as a microorganism charge in the treatment of incoming raw sewage, while a second portion of the settled sludge must typically be subjected to further prolonged treatment prior to disposal.

The foregoing activated sludge process, while effective in certain respects, has several disadvantages. For example, a portion of the sludge must be recycled to the sewage treatment chamber, requiring a significant capital investment in recycling equipment as well as continuing maintenance expenditures. In addition, in order to operate efficiently, the ratio of incoming raw sewage to recycled sludge must be carefully controlled, requiring continuous monitoring by skilled personnel of the incoming sewage wastes to control the amount of recycled sludge and maintain the desired operating parameters of the system. In addition, the sludge which is not recycled must be further treated and disposed of in a conventional manner, requiring additional treatment, transportation and disposal expenditures.

In order to overcome the foregoing problems, it has previously been suggested to extend the treatment time of the raw sewage in the presence of oxygen. After the microorganisms have depleted a substantial portion of the organic matter substrate as a food source from the sewage, the microorganisms in the presence of oxygen shift from a phase of growth and reproduction to a phase of autodigestion wherein they undertake endogenous respiration and/or intercell cannibalization, both yielding a reduction in the mass of microorganisms and a reduction in the amount of resulting biological sludge produced by the treatment system. For example, U.S. Pat. No. 3,694,353 of Yang, et al. purports to relate to such a system. While the extended aeration process has shown a degree of promise in overcoming the sludge removal and recycling problems inherent in the conventional activated sludge process, prior methods and apparatus for carrying out this process have been found to be lacking in certain respects. For example, the efficiency of obtaining total oxidation of organic matter and biological sludge in a sewage treatment process is highly dependent upon obtaining a thorough and complete, uniform, continuous mixing of mixed liquor and suspended solids in the system with an oxygen containing gas, a problem which has not been solved by prior apparatus designs. In addition, in order to obtain complete aerobic sludge autodigestion, it is necessary to provide means for forcing the microorganism population into the autodigestive phase at a location removed from the organic matter food source, i.e., the input for raw sewage.

As disclosed in my prior U.S. patent applications, Ser. No. 836,375 filed Sept. 26, 1977, now U.S. Pat. No. 4,142,975, and Ser. No. 947,780 filed Oct. 2, 1978, the foregoing problems can be overcome in a sewage treatment system that provides for complete, intimate, continuous contacting and intermixing of oxygen throughout mixed liquor in the system and completely eliminates the need for biological sludge recycling and routine biological sludge removal. Such a system is obtained in my prior applications by methods and apparatus comprising a series of treatment chambers, each chamber comprising an elongated sidewall of generally circular cross sectional configuration, first and second endwalls mounted in fluid-tight engagement with opposite ends of the sidewall to form a generally cylindrically shaped sewage treatment chamber therewithin, first and second baffle means vertically mounted in spaced relationship in the sewage treatment chamber longitudinally of and on opposite sides of the longitudinal central axis of the sidewall and in spaced relationship relative to the sidewall for directing the flow of mixed liquor within the sewage treatment chamber; gas supply means for supplying an oxygen containing gas to the treatment chamber at a location intermediate the first and second baffle means in a lower portion of the treatment chamber to cause mixed liquor in the treatment chamber to rapidly rise vertically upward between the first and second baffle means and then circumferentially outward and downward in a semicircular flow path defined by the interior surface of the sidewall to the bottom of the treatment chamber and then vertically upward again between the first and second baffle means; inlet means for supplying raw sewage to the first unit of the series; outlet means for withdrawing clarified effluent from the last unit of the series; and fluid communication means for maintaining an upper liquid level in the treatment chamber of each unit of the series and for providing serial fluid communication between an intermediate top portion of each successive unit of the series.

While the foregoing apparatus has been found to operate with a high degree of efficiency in the treatment of sewage, it has been found that certain modifications of the apparatus may be desirable under various circumstances, such as for the treatment of relatively small volumes of sewage as might be generated from a single family dwelling, or the like, without significantly varying from the method of sewage treatment disclosed in patent applications Ser. No. 836,375 filed Sept. 26, 1977, and Ser. No. 947,780 filed Oct. 2, 1978. It has therefore been determined that complete, intimate and continuous contacting and intermixing of oxygen throughout mixed liquor in a sewage treatment system and complete elimination of the need for biological sludge recycling and routine biological sludge removal is obtained by apparatus comprising a series of treatment chambers in a single sewage treatment unit; each treatment chamber having a generally circular peripheral cross-sectional configuration, conduit means in each treatment chamber for directing the flow of mixed liquor in each chamber, gas supply means for supplying an oxygen containing gas to each treatment chamber so as to cause a continuous flow pattern of mixed liquor in each treatment chamber; inlet means for supplying raw sewage to the first treatment chamber of the series; outlet means for withdrawing clarified effluent from the last treatment chamber of the series; and fluid communication means for providing fluid communication between an intermediate top portion of each successive treatment chamber of the series.

The system provides for a uniform, complete and thorough intermixing of mixed liquor and suspended solids throughout each treatment chamber, thereby eliminating the settling of any biological sludge in the apparatus, and additionally provides for uniform dispersal and intimate contacting of oxygen in the gas with mixed liquor and suspended solids throughout each treatment chamber, thereby providing a suitable environment for continuous aerobic activity of microorganisms in the mixed liquor. Serial fluid communication between chambers of the series provides an environment suitable for organic matter substrate consumption and microorganism generation and development in an initial treatment chamber of the series adjacent the raw sewage inlet means, an environment suitable for microorganism population maintenance in an intermediate treatment chamber of the series, and an environment suitable for forced autodigestion of the microorganisms in latter treatment chambers of the series, thereby eliminating biological sludge produced in the microorganism development phase.

BRIEF DESCRIPTION OF THE DRAWING

The inventive concepts may be more fully understood in association with the following drawing, in which:

FIG. 2 is a top view in cross section of the apparatus of FIG. 1; and

FIG. 3 is an end view of the apparatus of FIG. 1, taken along the line 3—3 of FIG. 1.

DESCRIPTION OF THE INVENTION

Figure 1:
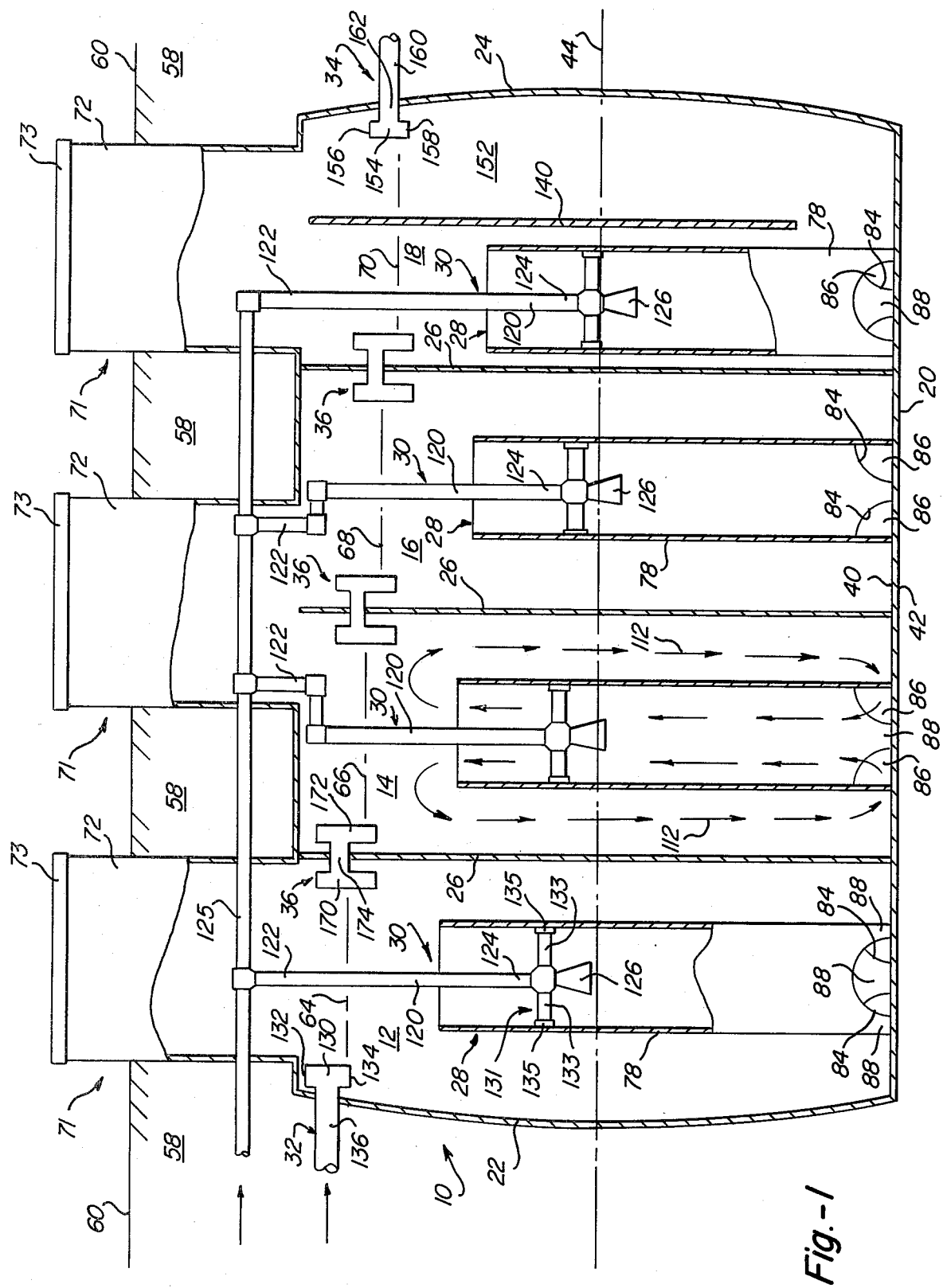
FIG. 1 is a side elevational view in cross section of the sewage treatment apparatus of the invention.

Referring now to FIGS. 1 and 2, the apparatus of the invention is shown to generally comprise a sewage treatment unit, generally shown at 10, having a series of sewage treatment chambers including a first chamber 12 of the series, intermediate chambers 14, 16 of the series and a last chamber 18 of the series. The treatment unit 10 comprises an elongated sidewall 20 having a generally circular peripheral cross sectional configuration; first and second endwalls 22, 24, respectively, mounted in fluid-tight engagement with sidewall 20; intermediate walls 26 mounted in fluid-tight engagement with sidewall 20 so as to define treatment chambers 12, 14, 16, 18; conduit means 28 for directing the flow of mixed liquor in each treatment chamber; gas supply means, generally shown at 30, for supplying an oxygen containing gas to the treatment chambers; inlet means, generally shown at 32, for supplying raw sewage to the first chamber of the series; outlet means, generally shown at 34, for withdrawing clarified effluent from the last chamber of the series; and fluid communication means, generally shown at 36, for providing fluid communication between an intermediate top portion of each successive chamber of the series.

UNIT SIDE AND END WALLS

Referring now to FIGS. 1 and 2, the treatment unit 10 is shown to comprise an elongated sidewall 20 having a generally uniform, circular peripheral cross-sectional configuration defined by relatively smooth inner sidewall surface 40 and outer sidewall surface 42. Sidewall 20 is elongated along its longitudinal, central axis 44 to define generally cylindrically shaped treatment chambers 12, 14, 16, 18, as will be hereinafter further described. The sidewall 20 is preferably made of relatively thin material for ease of handling, transporation and storage, and may be structurally reinforced such as by ribs, corrugations, or the like (not shown), to maintain the integrity of the sidewall in use.

The treatment unit 10 further comprises first and second endwalls 22, 24 adapted for fluid-tight engagement with opposite end portions of the sidewall 20. The endwalls 22, 24 may be integrally formed with sidewall 20 or may be otherwise mounted for sealed engagement with sidewall 20. Intermediate walls 26 are mounted in fluid-tight engagement with sidewall 20 in generally parallel spaced relationship between endwalls 22, 24 so as to define treatment chambers 12, 14, 16, 18 within the treatment unit 10 of approximately equal volume, with two of the walls 22, 24, 26 combining to form endwalls for each treatment chamber. The unit sidewall, endwalls and intermediate walls are preferably made of lightweight corrosion-resistant materials such as aluminum, fiberglass, rigid plastics or the like, but may be made of galvanized steel or other corrosion-resistant materials.

In use, sewage treatment chambers 12, 14, 16, 18 have fixed upper liquid levels 64, 66, 68, 70, as will be hereinafter further described. In addition, the unit is preferably provided with access means 71 for providing external access to each treatment chamber of the unit and for venting the portion of each treatment chamber above the upper liquid levels 64, 66, 68, 70 to the atmosphere. As shown in FIG. 1, access means 71 comprises relatively short-length tubular member 72 mounted on an upper surface portion of sidewall 20 and having a first end portion in fluid communication with at least one of the treatment chambers and a second end portion in fluid communication with the atmosphere. Access means 71 further comprises cover means, such as cover 73, adapted for loose capping engagement with the second end portion of tubular members 72, for removably covering the second end portion of the tubular members while allowing built-up gas accumulations in each unit of the series to escape to the atmosphere. As shown in the illustrative embodiment of FIG. 1, three such access means 71 are provided in association with the treatment unit 10. As further shown in FIG. 1, the treatment unit 10 is adapted to be located beneath the ground 58, with each of the tubular members 72 extending above the ground surface 60.

FIRST CONDUIT MEANS

Referring now to FIGS. 1, 2 and 3, the apparatus of the invention further comprises first conduit means 28 associated with each treatment chamber of the unit for directing the flow of mixed liquor in each chamber. In the illustrative embodiment of FIGS. 1, 2 and 3, first conduit means 28 comprises tubular members 78 vertically mounted in a central portion of each treatment chamber in spaced relationship to the chamber endwalls (the unit endwalls 22, 24 and/or intermediate walls 26) which define the chamber, and extend from a lower end portion 80 located in supporting engagement with sidewall 20 vertically upward to an upper end portion 82 located somewhat beneath the upper liquid level in the treatment chamber. Each tubular member 78 comprises fluid communication means, such as cut-out portions 84 located in the lower end portion 80 of tubular member 78 defining passageways 86, for providing fluid communication between the inside of the tubular member at the lower end portion thereof and the treatment chamber, three such passageways being associated with each tubular member in the illustrative embodiment of FIG. 1. Cut-out portions 84 further define support feet 88 adapted for supporting engagement of the tubular member 78 with the unit sidewall 20, as shown at 89.

GAS SUPPLY MEANS

Referring now to FIGS. 1 and 2, the apparatus further comprises gas supply means 30 for supplying an oxygen containing gas to the treatment chambers at a location within the first conduit means in a vertically intermediate portion of each treatment chamber. The gas supply means is located in relationship to the first conduit means so as to provide an adequate supply of oxygen to mixed liquor in the treatment chamber to ensure aerobic metabolism of microorganisms therein and to cause mixed liquor in the chamber to rapidly rise vertically upward within the first conduit means and then circumferentially outward and downward in a continuous path indicated by arrows 112 in FIGS. 1 and 3 to the bottom of the treatment chamber, through the passageways 86 and then vertically upward again within the conduit means, thereby causing a uniform, intimate and thorough mixing of the oxygen containing gas throughout the mixed liquor in the chamber and maintaining relatively heavy particulate solid matter and microorganisms in generally uniform suspension in the mixed liquor.

As shown in FIGS. 1 and 2, the gas supply means comprises a second conduit means 120 vertically mounted in coaxial relationship within first conduit means 28 and extending from an upper end portion 122 located above the liquid level in the treatment chamber to a lower end portion 124 located within the first conduit means, preferably at least about 18 inches beneath the liquid level in the chamber. As shown in FIG. 1, the second conduit means 120 are preferably provided with gas diffuser means 126 for diffusing gas from conduits 120 into mixed liquor in the first conduit means 28. Preferably, the gas diffuser means are adapted to provide a uniform supply of oxygen containing gas to the mixed liquor and thoroughly disperse the gas therein. In addition, the diffuser means are preferably provided with a unidirectional check valve (not shown) to minimize passage of solid matter into the second conduit means 120 if the system should need to be shut down. As further shown in FIG. 1, the second conduit means 120 are preferably additionally provided with locator means 131, such as relatively short-length pipe sections 133, closed by end-caps 135, mounted transversely to the second conduit means 120, for locating and maintaining the second conduit means in coaxial relationship with the first conduit means 28. The gas supply means further comprises means for supplying an oxygen containing gas under pressure to the second conduit means 120, such as pump 123, and interconnecting conduit section or sections 125 providing fluid communication between the pump 123 and the second conduit means 120. For most practical purposes, the gas supplied to the second conduit means 120 will be air. Under some circumstances, however, it may be desirable to supply oxygen-enriched air or pure oxygen to the second conduit means 120 to be dispersed throughout and dissolved in the mixed liquor in treatment chambers. The pressure of the gas supplied to the second conduit means 120 may be varied for particular design parameters to optimize mixing of the mixed liquor in the treatment chamber, as heretofore described.

RAW SEWAGE INLET MEANS

The apparatus of the invention further comprises raw sewage inlet means 32 for supplying raw sewage to the first treatment chamber 12 of the series. In the illustrative embodiment of FIG. 1, inlet means 32 comprises a substantially vertically oriented relatively short-length conduit member 130 having open top and bottom end portions 132, 134, respectively, and a substantially horizontally oriented conduit member 136 extending through endwall 22 of the first treatment chamber 12 of the series at about, or slightly above, the upper liquid level of the treatment chamber, the conduit member 136 having a first end portion in fluid communication with an intermediate portion of conduit member 130 and a second end portion in fluid communication with a source of raw seage (not shown). Preferably, conduit member 136 extends through endwall 22 at a location somewhat above the liquid level 64 in the first treatment chamber 12 of the series to prevent mixed liquor from treatment chamber 12 from backing up into the sewage inlet means.

CLARIFIED EFFLUENT OUTLET MEANS

Referring now to FIGS. 1 and 2, the apparatus of the invention further comprises clarified effluent outlet means 34 for withdrawing clarified effluent from the last treatment chamber 18 of the series. As shown in FIGS. 1 and 2, outlet means 34 comprises baffle means 140 vertically oriented in treatment chamber 18 in spaced, generally parallel relationship to endwall 24 and in fluid-tight engagement with sidewall 20, and extending into the treatment chamber 18 from sidewall 20 at a location above the upper liquid level 70 in the treatment chamber vertically downward to an intermediate location in the treatment chamber substantially below the liquid level 70. The baffle means is arranged and adapted to provide a quiescent zone 152 in the chamber 18 to allow any solid particulate matter, and primarily biological sludge, to settle from liquid in the quiescent zone, the settled solid particulate matter being continuously remixed in the mixed liquor in treatment chamber 18 and the supernatant being drawn from the quiescent zone as clarified effluent. The outlet means 34 further comprises means for withdrawing the clarified effluent from the quiescent zone, such as relatively short-length vertically oriented conduit member 154 having open top and bottom end portions 156, 158, respectively, and generally horizontally oriented conduit member 160 extending through endwall 24 of the chamber 18 and having a first end portion 162 in fluid communication with an intermediate portion of the conduit member 154 at about the upper liquid level 70 of chamber 18 and a second end portion in fluid communication with a suitable disposal site (not shown) for the clarified effluent.

The outlet means 34 may additionally comprise conventional settling aids, (not shown) such as settling tubes, inclined settling plates and the like, to enhance settling of solid particulate matter from the mixed liquor in quiescent zone 152.

FIELD COMMUNICATION MEANS

The apparatus of the invention further comprises fluid communication means 36 for providing fluid communication between an intermediate top portion of each successive chamber of the series and determining an upper liquid level in each treatment chamber. As shown in FIG. 1, fluid communication means 36 comprises a vertically oriented first conduit 170 adjacent a wall of one of the chambers of the series in an upper portion of the treatment chamber having an upper end portion extending above the liquid level in the treatment chamber and a lower end portion extending beneath the liquid level in the treatment chamber, a vertically oriented second conduit 172 in the next successive chamber of the series having a similar relationship to the upper liquid level in the treatment chamber thereof, and a substantially horizontally oriented third conduit 174 providing fluid communication between intermediate portions of the first and second conduits at about the upper liquid level in the treatment chambers. The horizontally oriented third conduit provides for overflow of fluid from one chamber to the next successive chamber, thereby establishing the upper liquid level in the one chamber, while the vertically oriented conduits prevent any foam or floating matter from passing between successive units. The fluid communication means are preferably slightly vertically lowered between successive chambers to provide a slightly lower liquid level 64, 66, 68, 70 in each unit than the liquid level in the next preceding unit, as indicated in FIG. 1, thereby preventing backflow of mixed liquor between the units. In addition, the fluid communication means are preferably horizontally offset from the vertical center of each unit to prevent the remote possibility of solids entering one end of a unit of the series and "skipping" across the moving surface of mixed liquor in the treatment chamber to pass directly out of the treatment chamber and into the next successive unit of the series.

OPERATION

Raw sewage enters the first treatment chamber 12 of the series via raw sewage inlet means 32. Mixed liquor in the treatment chamber 12 is in continuous movement in the flow path of FIGS. 1 and 3 due to the action of gas supply means 30 which provides an oxygen containing gas under pressure to interact with the mixed liquor and continuously raise the mixed liquor upward within the conduit means 28 of the chamber. As the mixed liquor within the conduit means is raised, an airlift is created which draws mixed liquor on the outside of the conduit means through the passageways 86 and into the conduit means, and establishes the continuous, uniform semicircular flow path of FIGS. 1 and 3. The continuous flow of mixed liquor conforms to the circular cross-sectional configuration of the inside surface of sidewall 20 and results in complete and thorough mixing of waste matter in the sewage and maintains a constant, intimate contact between the waste matter and microorganisms and oxygen in the mixed liquor. Since there are no "dead spots" in the treatment chamber, the mixing action continuously scours the inside surface of sidewall 20 and maintains solid waste materials in generally uniform suspension throughout the mixed liquor, thereby eliminating anaerobic decomposition, or putrefaction, of the organic matter. As raw sewage enters the first chamber of the series, an abundant supply of digestible organic matter is added to the treatment chamber 12, providing an ideal environment for the growth and reproduction of aerobic microorganisms in the mixed liquor.

As raw sewage is added to the first treatment chamber of the series, mixed liquor in the first chamber is displaced through the fluid communication means into the next successive chamber 14 of the series. The continuous movement and mixing action of mixed liquor in chamber 14 is the same as in chamber 12. In chamber 14, however, no new organic matter is introduced into the mixed liquor, so that microorganisms in the mixed liquor in chamber 14 must rely on a diluted excess of organic matter from the mixed liquor in unit 12 for any continued growth and reproduction or maintenance of the microorganism population. Treatment chambers 12 and 14 are designed for a particular sewage loading range so that the organic matter substrate concentration in the mixed liquor will be substantially reduced before passage of the mixed liquor out of chamber 14.

As mixed liquor is displaced out the first treatment chamber 12 into treatment chamber 14, a corresponding amount of mixed liquor is displaced out of chamber 14 into the next successive treatment chamber 16. Chamber 16 has a similar flow of mixed liquor and continuous mixing action as chambers 12 and 14. Since organic matter in the mixed liquor is substantially reduced prior to displacement of the mixed liquor from chamber 14, microorganisms in chamber 16 are forced by their environment out of a phase of growth and reproduction or population maintenance, and into a phase of aerobic autodigestion, i.e., endogenous respiration, and intercell cannibalization, thereby resulting in a substantial net decrease in suspended biological sludge or microorganism population in the mixed liquor.

As mixed liquor is displaced out of treatment chamber 14 into the next successive treatment chamber 16, a corresponding amount of mixed liquor is displaced out of treatment chamber 16 into the last treatment chamber 18 of the series. The flow of mixed liquor and complete mixing action in chamber 18 is similar to that in chambers 12, 14 and 16. In chamber 18, however, the mixed liquor contains a relatively large population of microorganisms, and the presence of oxygen and the further lack of organic matter substrate as a food source result in continue autodigestion and cannibalism of the microorganisms. A portion of the mixed liquor in treatment chamber 18 flows out of the normal flow path, under the baffle means 140, and into quiescent zone 152. Any remaining biological sludge, or other solid particulate matter, in the mixed liquor settles to the bottom of the quiescent zone and reenters the semicircular flow path in chamber 18 to continue autodigestion, resulting in an indefinite retention of biological sludge in the last unit of the series and thereby providing for complete oxidation of biological sludge and organic matter substrate prior to effluent discharge from the system. The supernatant in the upper portion of quiescent zone 152 thereby becomes a relatively solids-free effluent which is displaced from the quiescent zone as mixed liquor is displaced into treatment chamber 18 from treatment chamber 16.

Treatment chambers 12, 14, 16, 18 are designed for a particular raw sewage load capacity so that sufficient organic matter substrate of the raw sewage is present to support a growing, expanding microorganism population in the first chamber 12 of the series. As mixed liquor is displaced into the second chamber 14 of the series, the organic matter substrate in the mixed liquor displaced from the first chamber is diluted, preferably to an extent insufficient to support substantial continued growth of the microorganism population, thereby forcing the population into a phase of population maintenance, or status quo. In the third chamber 16 of the series, the organic matter substrate in the mixed liquor is even further diluted, preferably to an extent insufficient to provide for continued maintenance of the microorganism population, thereby forcing the population into a phase of autodigestion or endogenous respiration, where the microorganisms become self-consuming. In the last chamber of the series, the organic matter content of the mixed liquor is even further diluted and, since the microorganism content of the mixed liquor is retained indefinitely in the treatment chamber until autodigestion is complete, an equilibrium at a relatively high ratio of microorganisms to external organic matter substrate is approached which forces the microorganism population into an even more pronounced phase of autodigestion, resulting in substantially complete oxidation of both organic matter substrate and biological solids prior to effluent discharge from the system.

Although the foregoing description is applicable to optimum design criteria for a particular application, it is to be understood that the method and apparatus of the invention is capable of handling severe under and overloading stresses without adversely affecting effluent quality by experiencing natural shifts in the previously described environmental conditions of the separate treatment chambers.

As compared with conventional activated sludge systems and prior extended oxidation systems, the methods and apparatus of the present invention provide improved velocity gradients and energy input into the treatment system resulting in chemical oxidation demand removal and improved oxygen uptake in mixed liquor having substantially reduced solids levels. Although the precise mechanisms involved in obtaining these improved results are not presently completely understood, it is believed that they are a direct result of obtaining an improved ratio of respiration to synthesis in the microorganism population, an increased frequency of contact between the microorganism cells and organic matter substrate, the production of relatively smaller floc particles in the mixed liquor of the system with resultant improved utilization of organic matter substrate and oxygen uptake by the microorganisms, an increase in the rate of oxygen transfer through microorganism cell membranes, and/or maintenance of a relatively higher dissolved oxygen concentration in the mixed liquor through increased turbulence and agitation in the system.

For most purposes, it has been found that satisfactory results are obtained with an average mixed liquor detention time of about 10 hours in each chamber, it being understood that the retention time for biological sludge in the last treatment chamber 18 is extended indefinitely.

Although the foregoing apparatus has been described in association with a preferred embodiment having four treatment chambers arranged in series within a single unit, it is contemplated that the inventive concepts are equally applicable to embodiments having three or five or more treatment chambers, as heretofore described, arranged in series.

While the inventive concepts have been described in association with a presently preferred embodiment of the sewage treatment apparatus, it is contemplated that various modifications will be apparent from the disclosure. Such modifications are intended to be within the scope of the attached claims, except insofar as precluded by the prior art.

What is claimed is:

1. Apparatus for treating sewage to produce a clarified effluent and having a plurality of treatment chambers arranged in serial fluid communication, comprising:

a series of treatment chambers including a first chamber of the series, a last chamber of the series and at least one intermediate unit of the series, each such chamber comprising a sidewall of generally circular cross-sectional peripheral configuration having first and second end portions; first and second chamber endwalls mounted in fluid-tight engagement with the first and second end portions of the sidewall to define a generally cylindrically shaped sewage treatment chamber therewithin; a first conduit means vertically mounted in the treatment chamber in spaced relationship relative to the chamber endwalls for directing the flow of mixed liquor within the treatment chamber, the first conduit means comprising a tubular member extending from a lower end portion located in supporting engagement with the chamber sidewall vertically upward to an upper end portion terminating beneath the liquid level in the chamber, the lower end portion defining at least one passageway providing fluid communication between the inside of the tubular member and a lower portion of the treatment chamber; a second conduit means vertically mounted within the first conduit means in substantially coaxial relationship relative thereto and extending from an upper end portion above the upper liquid level in the chamber to a lower end portion within the first conduit means for supplying oxygen containing gas to the treatment chamber at a location within the first conduit means to cause sewage in the chamber to rapidly rise vertically upward within the first conduit means and then circumferentially outward and downward in a continuous path to the bottom of the treatment chamber and then vertically upward again within the first conduit means to cause an intimate and thorough mixing of the gas with the sewage in the treatment chamber and to thereby maintain relatively heavy particulate solid matter in generally uniform suspension throughout the sewage in the treatment chamber; and means for supplying an oxygen containing gas under pressure to the second conduit means;

inlet means for supplying raw sewage to the first chamber of the series;

means for providing a quiescent zone in the last chamber of the series;

outlet means for withdrawing clarified effluent from the quiescent zone at about the upper liquid level thereof; and fluid communication means for providing fluid communication between an intermediate top portion of each successive chamber of the series and determining an upper liquid level in each treatment chamber of the series.

2. The apparatus of claim 1 wherein the series comprises two intermediate chambers.

3. The apparatus of claim 1 which further comprises gas diffuser means associated with the second conduit means for diffusing the oxygen containing gas into the sewage.

4. The apparatus of claim 1 wherein the fluid communication means comprises a vertically oriented first conduit adjacent an endwall of one of the chambers of the series in an upper portion thereof, having an upper end portion extending above the liquid level in the one chamber and a lower end portion extending beneath the liquid level in the one chamber, a vertically oriented second conduit in the next successive chamber of the series in an upper portion thereof, having an upper end portion extending above the liquid level in the next successive chamber and a lower end portion extending beneath the liquid level in the next successive chamber and a substantially horizontally oriented third conduit providing fluid communication between intermediate portions of the first and second vertically oriented conduits at about the liquid level in the one chamber.

5. The apparatus of claim 1 wherein the means for providing the quiescent zone comprises:

baffle means vertically oriented in the last treatment chamber of the series in spaced, parallel relationship to the endwalls of the last chamber of the series and mounted in fluid tight engagement with the unit sidewall, the baffle means extending into the last treatment chamber of the series from a location above the upper liquid level thereof vertically downward to an intermediate location in the last treatment chamber of the series substantially below the upper liquid level thereof.

* * * * *